United States Patent Office 3,047,415
Patented July 31, 1962

3,047,415
VINYL RESIN-EPOXY FATTY ACID COATING
COMPOSITION, METHOD AND ARTICLE
Philip H. Rhodes, Cincinnati, Ohio, and Thomas W. Findley, La Grange, Ill., assignors to Swift & Company, Chicago, Ill., a corporation of Illinois
No Drawing. Filed Feb. 26, 1959, Ser. No. 795,607
14 Claims. (Cl. 117—21)

This invention relates to coating compositions and more particularly to a method for providing protective and decorative coatings for a wide variety of substrate materials, said coatings being characterized by good physical strength and hardness, chemical resistance, flexibility and adhesion to many surfaces.

While vinyl halide resins can be formulated and adapted for application to the surfaces of various objects to provide coatings having many advantageous properties such as good flexibility and good strength, such coatings do not exhibit good adhesion to the surface upon which they are deposited and do not have particularly good resistance to continued exposure to high temperatures and to the effect of active solvents. These vinyl halide films do not adhere to smooth non-porous surfaces upon which they are deposited unless the surfaces are first pretreated with a primer coat.

It is, therefore, an object of this invention to provide modified vinyl coatings having excellent properties of flexibility and adhesion to smooth non-porous surfaces in addition to other desirable properties which are normally associated with vinyl halide polymer coatings.

A further object of this invention is to provide a method for preparing adherent coating compositions from vinyl halide resins which when cured adhere tenaciously to the material being coated.

Still another object of the invention is to provide novel heat hardenable vinyl compositions protected against heat degradation.

Additional objects, if not specifically set forth herein, will be readily apparent to one skilled in the art from the following detailed description of the invention.

The present invention provides an improved method for depositing a mixture of a thermoplastic vinyl polymer and a polyepoxy fatty material on an object and subsequently curing the mixture to form a hard, tough, flexible coating which adheres to the object. Also provided by the invention are the hard, tough, yet flexible products obtained by this method. These compositions can be prepared as clear films since the two necessary components of the mixture are very compatible. The films formed exhibit good tensile strength along with good adhesion and a high resistance to heat degradation. In addition, these coatings possess good solvent and alkali resistance and a high impact resistance. A further advantage of the coating compositions, particularly where bendable materials such as sheet metals are coated, is the resistance to separation of the coating from the substrate when the metal is flexed or subjected to bending.

The film-forming and coating method can be represented as follows:

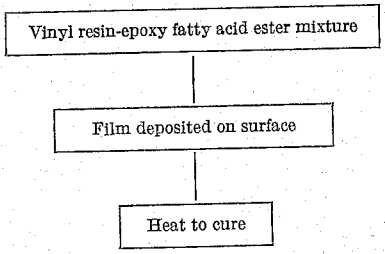

Generally, the coating compositions of this invention comprise the hard, tough adherent products resulting from curing a mixture of a vinyl halide polymer or copolymer and an oxirane containing fatty material having sufficient oxirane content to insure compatibility with the vinyl resin. These compositions are particularly valuable in coating objects which may be exposed to elevated temperatures without being adversely affected by the elevated temperatures since the composition may be applied to the surface of the object and the coated object may then be heated to harden the coating.

Epoxy-containing fatty materials which may be employed in preparing the modified vinyl halide hardenable mixture include generally liquid polyepoxy containing fatty acid esters. These oxirane-containing compositions have several oxirane groups in an internal open chain portion of the molecule and are substantially free of terminal oxirane groups. Epoxidized linseed oil and epoxidized perilla oil are good examples of polyepoxy containing naturally occurring triglyceride materials suitable for use as the oxirane-containing component of the coating composition. The oxirane group is introduced by well-known methods into the fatty acyl portion of the unsaturated fatty acyl molecule across carbon to carbon linkages formerly occupied by unsaturated bonds. Naturally occurring vegetable oils, such as linseed oil and perilla oil, may be epoxidized by any of the conventional methods involving percarboxylic acids, for example. Because of the high oxirane oxygen content, these epoxidized oils exhibit good compatibility with the resin and also contain sufficient epoxy to insure that the mixture will harden within a reasonable period of time when subjected to heat.

Epoxy-containing glycerides coming within the scope of this invention include epoxidized linseed oil, epoxidized perilla oil, and mixtures thereof as examples of oxirane components prepared from naturally occurring materials. Generally, any epoxidized triglyceride having sufficient non-conjugated unsaturation in the molecule to provide upon epoxidation a composition having an oxirane content of more than about 8.5 is satisfactory. Epoxidized linseed oil, for example, may have an oxirane content of from about 8.5 to about 10.5 depending upon the iodine value of the oil prior to epoxidation and the efficiency of conversion of the unsautration present in the unepoxidized oil to three membered oxirane groups. Also contemplated in this invention are materials such as epoxidized trilinolein and epoxidized trilinolenin as well as mixed glyceride esters having an oxirane content above about 8.5. These high oxirane fatty acyl derivatives exhibit the dual properties of good compatibility with the vinyl halide resin and the tendency to set up rapidly when heated in the vinyl halide mixture. The polymerizable plasticizers may be characterized as esters of oxirane-containing higher fatty acids (10–22 carbons) with an aliphatic alcohol of a molecular weight sufficiently low that the oxirane content of the ester exceeds 8.5. Particularly useful epoxy compositions are those having an epoxy content in the range 8.8–9.5. These monomeric compositions are liquids of relatively low viscosity, below about 10 stokes.

Because of the desirable compatibility of these high oxirane glycerides with the vinyl halide resins, workable dispersions of the resin-epoxide mixture can be prepared without the necessity of employing other plasticizers although, of course, the invention contemplates the use with the epoxide of known vinyl plasticizers such as dioctyl phthalate, octyl cresyl phosphate, dibutyl phthalate, and other alkyl and alkoxy alkyl ethers of dicarboxylic acids.

It is also within the contemplation of the invention to supplement the high oxirane-containing fatty material with monohydric alcohol esters of epoxy-containing fatty acids. Epoxy fatty acid esters of lower alkyl alcohols may advantageously be employed as viscosity reducers in the plastisols prepared from the high oxirane component and the vinyl resin. Monohydric alcohol esters of epoxidized linseed oil fatty acids such as the methyl, propyl, isopropyl, butyl and hexyl through octyl esters, may desirably be employed for this purpose.

Vinyl polymers which may be employed in preparing the heat-hardenable fluid coating composition are those polymers in which at least 50% of the monomer units are vinyl halide units. This includes primarily vinyl halide polymers such as polyvinyl chloride, polyvinyl bromide, polyvinyl fluoride; vinyl chloride-vinylidene chloride copolymers and vinyl chloride-vinyl acetate copolymers as well as interpolymers or homopolymers of vinyl halides. Other vinyl-containing monomers which may be copolymerized with the vinyl halide include vinyl ketones such as vinyl butyl ketone, the acrylates, and lower alkyl esters of maleic and fumaric acid. These compositions are well-known in the art.

The preferred polymeric component of the compositions employed in preparing the coatings from plastisols are the vinyl halide polymers of high molecular weight above about 25,000 and usually around 100–200,000. The polymer should be a dispersion type resin capable of forming a plastisol type dispersion. Resins in the physical form of very small particles, i.e. around 10 microns or less are very suitable for this purposes. A very satisfactory polyvinyl chloride polymer of this type is the product marketed by the B. F. Goodrich Co. as Geon 121.

The mixture of the polymer and epoxy-containing glyceride material may be formulated as a plastisol, organosol, solution, latex or as a powder. The coating may be applied to the object to be coated by conventional means such as dipping, brushing, knife coating, roller coating, or spraying. Other methods of application include immersion of a preheated article to be coated in a fluidized bed of the coating composition in discrete particle form; and formation of a film of the coating composition and placing the preformed film on the object followed by cure. Objects which may be coated include nonabsorbent solid surfaces such as metals, glass, and jewelry, and also absorbent materials such as paper, leather, and wood. Black iron plates, sheets of tin plate, galvanized iron, and aluminum foil may be sprayed with the fluid composition or passed through a vat containing the fluid composition in high-speed fabrication of coated sheet metal materials. The type of object which may be coated is limited only by the ability of the object to withstand curing temperatures without adverse effects.

In accordance with the method of this invention, a vinyl halide polymer such as polyvinyl chloride is mixed with a polyoxirane glyceride such as high oxirane epoxidized linseed oil and the mixture is applied to the surface of an object such as chrome plate or tin plate. The object supporting the film is then heated at an elevated temperature for a time sufficient to cure the film and produce a hard, tough yet flexible, adherent coating. Although the proportions of polyepoxidized glyceride which may be employed in the formulation can be varied considerably depending upon the mechanical properties desired in the cured coating, and also depending upon the ease of application of the fluid mixture to the object, it is desirable to employ about 3–100 parts of epoxy containing glyceride for each 100 parts of polymer. At the higher levels of epoxidized oils the curing cycle must be extended. Higher and lower amounts of the polyepoxidized glyceride may be used in formulating the mixture, but the above proportions have been found to provide a fluid mixture having a viscosity within a range permitting easy application to the object being coated.

The ideal time and temperature of cure for a given epoxidized ester-vinyl resin mixture is best determined by trial and error. The tensile strength of the coating depends upon the degree of cure, and tensile strength for a given coating cured at a specific temperature, say around 210° C., rises with time of exposure and reaches a maximum just prior to degradation of the vinyl resin. Usually temperatures within the range of the fusion temperature of the vinyl resin (around 165° C.) and about 220° C. is satisfactory. Lower curing temperatures may be employed with substantially longer curing time and higher curing temperatures with very short treatment time can also be used. It should be realized that the time of exposure at any given temperature within the above-noted range will be governed by the degree of cure and the tensile strength desired. The sensitivity to heating of the object being coated is also a factor to be considered in determining the temperature and time.

As used in this specification and claims the term "cure" and "curing" have the meaning well known in the art. Cure signifies the change in physical properties of the polymer by heat, actinic radiation, chemical curing agents etc. such that the polymer is changed from a fusible form to an infusible form and from a form wherein it is soluble in certain solvents to one where solubility in such solvents is materially decreased.

Cure can be determined either by a heat sealing test or by measuring the decrease in oxirane content of the composition resulting from cure. In the heat sealing test the coating composition is deposited on the surface of two four inch square 24 gauge bonderized steel panels and cured. The two panels are placed in an oven with the coated faces of the panels in face to face relationship and the oven temperature held at 220° C. for 20 minutes. At the end of this time the panels are removed and cooled. If the coatings have been cured there will be no mutual adhesion and the coated surfaces are readily separable. If on the other hand the coatings are interfused or have become heat sealed and not readily separable the coatings are not considered cured.

In an alternative method for determining whether a composition has been cured, the oxirane content of the composition is determined before and after heat treatment. A decrease in oxirane content of the mixture of 20% or more based upon the oxirane content prior to cure treatment is evidence of cure. Oxirane content is determined by a modification of the method published by A. J. Durbetaki in Analytical Chemistry, vol. 28, No. 12, December 1956, pp. 2000, 2001. Percent oxirane is the ratio of weight of oxirane oxygen to total molecular weight of the composition $\times 100$.

The compositions of this invention are quite superior to known vinyl halide resinous materials in that the instant compositions can be cured solely by the application of heat and the hard, tough coating resulting has far better chemical resistance properties and a much greater resistance to melting at elevated temperatures, than conventional vinyls.

Heretofore, when it was desired to have a vinyl halide coating composition exhibit good adhesion to a nonporous surface, it has been necessary to use a primer base coat before the application of the vinyl coating composition. Such base priming coatings have been applied as solutions of mixtures of various resins after which the applied prime coat is dried and baked to provide a prime-coating characterized by good adhesion to the article surface and yet not sufficiently inert that a super-imposed vinyl coating will not be incompatible when the vinyl coating is subsequently fused or baked.

While the coating compositions of the present invention exhibit vastly improved adhesion to substrate in the absence of primer, it should be noted that in many applications it may be advantageous to utilize a suitable primer for the purpose of increasing the degree of adhesion to a substantially higher level.

The following examples which are set forth for the purpose of illustration only and are not to be considered limitative in any respect, show the preparation of various protective and decorative coatings, and the variety of means by which the coatings may be deposited.

EXAMPLE I

A plastisol of 100 parts polyvinyl chloride (Geon 121 containing more than 90% polyvinyl chloride) and 80 parts of epoxidized linseed oil (oxirane content 9.2%) was prepared by mixing the resin and epoxidized oil in a Hobart mixer for 15 minutes and subsequently deaerating the plastisol under vacuum. The plastisol composition was deposited upon a chrome plate and the coated chrome plate was cured at 218° C. for 7½ minutes. At the end of this time a hard, clear coating having good adhesion had been formed, although an additional 2½ minutes curing improved the adhesion of the coating to the metal.

EXAMPLE II

Plastisols were prepared by mixing 100 parts polyvinyl chloride (Geon 121) and 100 parts of the appropriate oxirane-containing glyceride in a Hobart mixer for 15 minutes and deaerating both plastisols under vacuum. Films of 40 mils thickness were then cast on bonderized steel panels after which the panels were heated at various temperatures for specified lengths of time. The peel strengths of these cured specimens were determined where possible according to the Standard Method of Test for Peel or Stripping Strength of Adhesives, which is the test described in the ASTM Standards, part 7, 1956, designated as ASTM D-903-49. In this test the films on the metal plates are cut with a knife or other sharp instrument to free about a 1-inch portion of the film from the panel and the freed end of the film is pulled with a force exerted in a direction 180° from the plane of the coated object. The force necessary to overcome the adherence of this 1-inch strip to the substrate is recorded as the peel strength in pounds per inch. It is readily evident that the film must have sufficient tensile strength to permit exerting this force on the film without breaking the film. The following tables show the results of the peel strength tests of the two compositions prepared from epoxidized linseed oil (oxirane content 9.0) and epoxidized soybean oil (oxirane content 6.3), each of these oils being incorporated in a 1 to 1 weight ratio in a plastisol with Geon 121.

*Table 1.—Plastisol Containing Epoxidized Linseed Oil (Oxirane Content 9.0)*

CURE TEMPERATURE 190° C.

| Cure time: | Peel strength, lbs./in. |
|---|---|
| 15 minutes | 0–0.5 |
| 30 minutes | 0.5–1.0 |
| 45 minutes | 4.0–4.5 |
| 75 minutes | 7.0 |
| 90 minutes | 9.0 |
| 120 minutes | 9.5 |

CURE TEMPERATURE 210° C.

| Cure time: | |
|---|---|
| 20 minutes | 9.5 |
| 25 minutes | 14.0 |
| 30 minutes | 14.0 |

CURE TEMPERATURE 230° C.

| Cure time: | Peel strength |
|---|---|
| 3 minutes | 0.25–0.5 lbs./in. |
| 5 minutes | 2.0 lbs./in. |
| 8 minutes | 3.5–4 lbs./in. |
| 10 minutes | Film decomposed. |

*Table 2.—Epoxidized Soybean Oil (Oxirane Content 6.3)*

CURE TEMPERATURE 190° C.

| Cure time: | Remarks |
|---|---|
| 15 minutes | No adhesion. |
| 30 minutes | Do. |
| 45 minutes | Film decomposed. |

CURE TEMPERATURE 210° C.

| Cure time: | Remarks |
|---|---|
| 10 minutes | No adhesion. |
| 15 minutes | Do. |
| 20 minutes | Film decomposed. |

CURE TEMPERATURE 230° C.

| Cure time: | |
|---|---|
| 1 minute | No adhesion. |
| 3 minutes | Do. |
| 5 minutes | Film decomposed. |

EXAMPLE III

To a plastisol containing 100 parts Geon 121 and 100 parts epoxidized linseed oil (oxirane content 9.0) was added 3 parts of red iron oxide. The red iron oxide appears to be a cure accelerator. 40 mil films of this plastisol were cast on bonderized steel panels. The panels were heated at 210° C. for varying lengths of time, and peel strengths were determined after measured curing times. The results are listed below.

| Cure time: | Peel strength, lbs./in. |
|---|---|
| 15 minutes | 4.5 |
| 20 minutes | 20–24 |
| 25 minutes | 12–13 |
| 30 minutes | 10–11 |
| 35 minutes | 9–13 |

Of course, an uncured film shows no adhesion, and film prepared from epoxidized soybean oil as the oxirane-containing component showed no adhesion, finally decomposing after around 20–25 minutes.

It may be pointed out that had the red color in this example been obtained by the use of a cadmium pigment, as for example, cadmium selenide, the curing time and subsequent development of adhesion would have been extended rather than accelerated. It is obvious that choice of pigments will to some extent govern not only the time of cure but also the temperature of cure which is needed in order to obtain optimum adhesion. The development of optimum adhesion on substrates other than steel, as for example aluminum, glass, ceramics, etc., will vary in accordance with any chemical effect induced by the reactivity of the surface being coated with the coating composition.

EXAMPLE IV

The following organosol type spray coatings containing pigments were sprayed on metal panels and the panels cured to provide pigmented coatings. In each case a glossy, stable colored coating resulted. A mixture of 100 parts polyvinyl chloride (Geon 121) and 60 parts epoxidized linseed oil (oxirane content 9.2) were thoroughly mixed with 110 parts of solvent (Apcosol 150). 3 parts of pigment (Phthalo Blue) was added to this composition and the solution was sprayed on a metal panel and the panel heated to provide a pigmented coating. A similar composition was also prepared except that 20 parts of chrome yellow pigment was substituted for the blue pigment of the foregoing composition. The films were then cured at 210° C. for 10 minutes. The coating formed by curing the film containing the blue pigment was an attractive, glossy, transparent blue while the yellow coating was smooth, glossy, and free from imperfections. In both cases the coatings were hard and flexible.

EXAMPLE V

A coating formulation adapted for casting was prepared by dissolving 100 parts of a solution type resin Vinylite VMCH, specifically a terpolymer of 86% vinyl chloride, 13% vinyl acetate, and 1% maleic acid in 130 parts epoxidized linseed oil (oxirane content 9.10) and 400 parts methyl isobutyl ketone. The terpolymer is slowly added to the ketone with stirring, and when the resin is completely dissolved the epoxidized linseed oil is added.

A film prepared from this solution by casting on aluminum foil using a Bird applicator and cured at 230° C. for 10 minutes exhibited good adherence to the metal substrate.

Substituting Vinylite VAGH (91% vinyl chloride, 6% vinyl alcohol, 3% vinyl acetate) for the Geon resin resulted in a similarly satisfactory coating.

EXAMPLE VI

A powder coating composition is prepared from the following ingredients:

| | Lbs. |
|---|---|
| Geon 103–EP | 100 |
| Epoxidized linseed oil (oxirane content 9.0) | 60 |
| Chrome yellow pigment | 5 |

The Geon 103–EP resin which is reported to be a +90% polyvinyl chloride resin of high molecular weight was placed in a standard, jacketed, ribbon-type blender and a portion of the high oxirane oil was distributed throughout the resin in the dry blender. Heating of the contents of the blender was obtained by introducing steam to the heating jacket of the blender and while so heating the mix the balance of the high oxirane oil was added. The resin had completely absorbed the high oxirane oil after about 30–45 minutes of mixing and heating and the product was a dry, free flowing powder. The pigment was added to the powder in the mixer and uniformly distributed throughout the resin mix by continued mixing. After screening of the product to remove large lumps a portion of the powder was coated on a sheet of mineral fibered wallboard by shaking the powder on the surface of the wallboard. The coating of powder was about 1/32 of an inch in depth. The coated wallboard was then passed under an infrared heating panel, the heat from the panel causing the coating powder to be heat-fluxed and flow to form a smooth, pore free coating. Additional heat was applied for a short period of time for the purpose of converting the fused coating to the cured form.

The powder is also useful for coating preheated surfaces and may be sprayed on hot metallic objects, for example.

EXAMPLE VII

A dry blend extrusion compound containing the following ingredients:

| | Lbs. |
|---|---|
| Geon 103–EP | 100 |
| Epoxidized linseed oil (oxirane content 9.0) | 55 |
| Calcium carbonate | 15 |
| Titanium dioxide | 10 | was used as a feed stock to an electrically heated extruder equipped with a T-shaped die adapted to produce a thin sheet of plastic material. The equipment was adjusted and arranged to provide a continuous web of relatively thin gauged metal passing beneath the die opening of the extruder. This arrangement permitted placing the extruded film in contact with the moving web of metal beneath the extruder, thus continuously removing the formed film. The metal sheet was coated with the thin preformed film, then passed beneath a textured, cooled, embossing roll to form a pattern in the molten plastic. The textured coated metal sheet was then passed through an oven wherein the heat was adjusted so as to provide a cure. The white coating on the metal was found to be tenaciously bound to the metal web.

The coating of large objects for the purpose of reducing corrosion is best carried out if the coating composition has a very low viscosity. It is contemplated in the practice of this invention that nonflammable, low viscosity compositions be prepared from polyvinyl chloride latices as the resin-supplying component. The high oxirane oil is emulsified and added to the polyvinyl chloride latex. Objects which are to be coated are immersed in the latex mixture and, after draining, the coated object is heat cured to provide a cured, adherent, corrosion-resistant coating.

Suitable vinyl supplying components for this purpose are the colloidal dispersions of vinyl chloride polymers and copolymers in water. These water dispersions commonly referred to as latices contain approximately 50–55% total solids and the resin particles are true colloids of spherical shape.

Although as has been noted previously curing agents are not required in all cases to produce a cured coating having unexpected properties, it is also within the contemplation of the invention to accelerate the cure of the coating compositions where desired by curing agents. Epoxy curing agents such as maleic acid, maleic anhydride, pyromellitic anhydrides, and other acids and anhydrides of the type disclosed in copending application Serial No. 651,821, filed April 10, 1957, may be employed. The following examples illustrate curing compositions which provide unique benefits when combined with the high oxirane fatty ester and polyvinyl halide resin.

EXAMPLE VIII

| | Grams |
|---|---|
| Geon resin 121 | 300 |
| Epoxidized linseed oil (oxirane content 9.0) | 300 |
| HET anhydride (1,4,5,6,7-hexachlorobicyclo-(2.1)-5-heptene-2,3-dicarboxylic anhydride) | 250 |

A plastisol of the above ingredients was prepared in the manner described previously and the plastisol was coated on a steel panel which was baked for 10 minutes at 190° C. A very hard and brittle adherent coating was present on the steel panel after cooling. Because of the high activity of the anhydride curing agent the above composition hardened in the container in which it was stored after one day and could not be spread or coated. Pot life of the coating composition containing a curing agent is improved considerably while retaining the advantage of accelerating the rate of cure by the use of isophthalic acid as the curing agent.

EXAMPLE IX 300 grams Geon 121 and 210 grams of high oxirane epoxidized linseed oil (oxirane content 9.0) were mixed in the usual way to form a smooth plastisol. A dispersion of 300 grams high oxirane epoxidized linseed oil (oxirane content 9.2) and 300 grams isophthalic acid were mixed thoroughly and passed over a 3-roll mill to provide an intimate dispersion of the acid in the high oxirane oil. The dispersion of isophthalic acid in the oil was mixed with the plastisol, the proportion of the two compositions being such that the mixed composition provided a ratio of 100 parts polyvinyl chloride resin, 100 parts high oxirane oil, and 300 parts isophthalic acid. The resulting composition was coated on a steel panel and cured for 5 minutes at 210° C. The tough, adherent, transparent film which resulted possessed good aging properties. After 30 days the coating composition was examined and was found to have retained its initial viscosity and other desirable characteristics.

It can be appreciated from the foregoing that as the degree of cure is increased a more adherent film is produced up until the point at which some degradation is initiated. It can also be seen that the oxirane content of the epoxidized fatty material must be above 8.5 and can be as great as 12.5 as in the case with trilinolenin. These materials, when combined with the polyvinyl chloride resin having more than 50% vinyl chloride units, provide a smooth, workable mixture. The films which are produced after curing have a high impact strength, good tensile strength, and an improved resistance to melting at elevated temperatures compared to vinyl compositions not containing high oxirane epoxidized fatty materials.

Plastisol coating compositions may be bonded to metallic or other nonporous surfaces by the use of primer compositions. Such primers are generally composed of a resin such as Vinylite VMCH and other resins or rubbers selected to reduce the sensitivity of the VMCH resin to the plasticizers in the standard plastisols previously used for coating. Vinylite VMCH is a vinyl chloride vinyl acetate terpolymer containing 86% vinyl chloride, 13% vinyl acetate, and 1% of a dibasic acid such as maleic acid. A typical primer is one identified as XL-5497, published in a release No. 21 entitled "New Primer for Vinyl Dispersion Finishes," dated October 1956, and published by the Bakelite Corporation. That formulation is as follows:

| | Grams |
|---|---|
| Bakelite phenolic resin BKR 2620 | 14.3 |
| Bakelite vinyl resin VMCH | 14.3 |
| Methyl ethyl ketone | 14.3 |
| Methyl isobutyl ketone | 57.1 |
| | 100.0 |

It is stated that such a primer should be applied to form a thin film on clean metal after which it is baked from 5 to 15 minutes at 180° C. to 205° C. before application of the plastisol. This baking is designed to fuse the primer to the sheet metal, but the temperature should not be sufficient to cause the primer coat to become cured or decomposed. A more suitable priming composition for bonding the coating compositions containing epoxidized linseed oil has been found to be one which contains at least 75% by weight of VMCH resins taken on the total weight of the resin solids with the balance of the resin composition comprising acrylonitrile-butadiene rubbers typified by Hycar synthetic rubber as produced by B. F. Goodrich Chemical Company. Priming compositions of this character do not appear to have the sensitivity to solvation exhibited by the well known primers of the prior art. Consequently, when the VMCH-Hycar primers are utilized in conjunction with exopidized glyceride oil coating compositions, excellent bonds are obtained to the coated surfaces even though the coating composition is not fully cured; however, obviously, the best adhesion is developed at optimum cure. Other forms of the resin such as organosols solutions, dry blends, etc., are similarly effective with the primer.

The compositions of this invention can also be modified by the addition of pigments, fillers, stabilizers, lubricants, etc., without detracting from the benefits of the invention. While stabilizers will retard the rate of cure, it is well within the ability of those skilled in the art to increase the curing temperature or curing time to compensate for the presence of stabilizers.

Obviously, many modifications and variations of the invention as hereinbefore set forth may be made without departing from the spirit and scope thereof, and therefore only such limitations are to be imposed as are indicated in the appended claims.

We claim:

1. A method of forming a hard, tough, flexible, adherent vinyl halide film comprising depositing a mixture of a vinyl chloride polymer and an oxirane-containing glyceride material having an oxirane content in excess of 8.5%, the oxirane groups of which are located in internal open chain portions of the glyceride molecule, on the surface of an object, spreading said mixture to form a film, and heating said object and supported film to a temperature and for a time sufficient to set said mixture and form an insoluble, infusible film.

2. The method of claim 1 wherein the mixture is in the form of a dry powder.

3. A method of forming a hard, flexible, adherent vinyl halide film which comprises depositing a mixture of a vinyl halide polymer and an oxirane-containing glyceride material having an oxirane content of in excess of 8.5%, the oxirane groups of which are located in internal open chain portions of the glyceride molecule, said mixture being substantially free of chemical curing agents, on the surface of an object; forming a film of said mixture on said surface and thereafter hardening said mixture solely by the application of heat whereby to provide a hardened film which adheres to said surface.

4. A method of coating an object with a tough, flexible, adherent vinyl halide film comprising dispersing a vinyl halide polymer containing at least 50% vinyl halide units in a liquid triglyceride, said triglyceride containing a plurality of oxirane groups in an internal open chain portion of the triglyceride molecule to provide an oxirane content of 8.5–12.5%, and subjecting the object and supported film to an elevated temperature for a time sufficient to harden said film into an insoluble, infusible form.

5. A method of coating a nonabsorbent article with a heat-hardened adherent coating of a vinyl halide polymer which comprises depositing a mixture of (1) a vinyl halide polymer selected from the group consisting of polyvinyl chloride containing at least 90% vinyl chloride units; copolymers of vinyl chloride and a dissimilar monomer containing a $CH_2=C<$ group having a molecular weight above about 20,000; polyvinylidene chloride and copolymers thereof, and (2) an oxirane-containing triglyceride wherein the oxirane content exceeds about 8.5%, the oxirane groups of said triglyceride being located on internal open chain portions of the glyceride molecule, on a nonabsorbent surface and heating said mixture to an elevated temperature for a time sufficient to cure said mixture to form a tough, adherent coating.

6. A method of coating a metal surface with a hard, flexible, adherent vinyl halide film comprising the steps of dispersing finely divided particles of vinyl halide polymer in a liquid oxirane-containing glyceride, said glyceride having an oxirane content in excess of 8.5% whereby to provide a smooth, fluid plastisol mixture, applying the mixture in the form of a continuous film to the surface to be coated, and subjecting said continuous film to a curing temperature for a time sufficient to form an adherent, insoluble, infusible coating on said surface.

7. A heat-hardened polymeric composition comprising a vinyl halide polymer consisting predominantly of a vinyl halide and a lesser amount of other mono-olefinic monomers and an oxirane-containing fatty acid ester having an oxirane content of about 8.5–12.5%.

8. A process for preparing hard, tough vinyl chloride polymers having an increased resistance to melting at elevated temperatures and an increased resistance to heat-induced deterioration comprising embodying with a vinyl chloride polymer containing at least 50% vinyl chloride units an ester of a lower alkyl polyhydric alcohol and a fatty acid, said fatty acid containing a plurality of oxirane groups sufficient to provide in said ester an oxirane content of 8.5–12.5% epoxy oxygen, and heating the polymer-epoxy ester mixture to effect curing of said mixture.

9. A process for preparing hard, tough vinyl chloride polymers having an increased resistance to melting at elevated temperatures and an increased resistance to heat-induced deterioration comprising embodying with a vinyl chloride polymer containing at least 75% vinyl chloride units an ester of a lower polyhydric alkanol and a fatty acid, said fatty acid containing a plurality of oxirane groups sufficient to provide in said ester an oxirane content of 8.5–12.5% epoxy oxygen and a curing agent selected from the group consisting of isophthalic acid and HET anhydride, and then heating the so formed mixture to effect curing thereof.

10. A cured, plastic film comprising a hard, tough, thin sheet of polyvinyl chloride prepared from a fluid mixture of polyvinyl chloride and an oxirane-containing fatty ester having an oxirane content above 8.5%, the oxirane content of said cured sheet being at least 20% less than the oxirane content of the fluid mixture prior to cure, said film being resistant to flow at elevated temperatures.

11. A process for coating a substrate with a tough, adherent, protective vinyl halide coating which is substantially insoluble in organic solvents and infusible at elevated temperatures comprising depositing a thin film of an adhesive primer which is compatible with the vinyl halide coating composition on said substrate, baking said primer on said substrate by heating to a subcuring temperature to form a thin film; applying on said film a continuous film of a plastisol of polyvinyl chloride and high oxirane content epoxidized linseed oil, the oxirane content of said oil being in the range 8.5–12.5%, and subjecting said coated substrate to a curing temperature for a time sufficient to impart cure thereto.

12. A method of coating a surface with a flexible, tough, adherent, protective coating comprising forming a film of a polymer comprising a mixture of a vinyl halide resin having at least 50% vinyl halide units and an oxirane-containing glyceride having an oxirane content above 8.5%; placing said preformed film on the surface of said object and subjecting said object and said film to a curing temperature for a time sufficient to convert said film from a thermoplastic form to a thermosetting form and cause said thermoset film to adhere to said surface.

13. A method of coating an object with a protective coating which is resistant to the degradative effect of light and elevated temperatures comprising depositing a mixture of a vinyl chloride latex containing at least 50% vinyl chloride units and an epoxy glyceride having an oxirane content greater than 8.5% on the surface of said object whereby to provide a continuous coating on the surface of said object; drying said coated object to remove water therefrom and curing said coated object to provide a tough, adherent coating.

14. A method for coating an object with a hard, flexible, adherent vinyl halide film comprising: forming a mixture of a solution-type vinyl halide resin in a solvent for said resin and a high-oxirane triglyceride containing a plurality of oxirane groups in an internal open-chain portion of the triglyceride molecule, said triglyceride having an oxirane content of 8.5–12.5%, depositing a film of said composition on a surface and curing said film to form a flexible, adherent coating.

References Cited in the file of this patent

UNITED STATES PATENTS

| | | |
|---|---|---|
| 2,559,177 | Terry et al. | July 3, 1951 |
| 2,707,157 | Stanton et al. | Apr. 26, 1955 |
| 2,771,472 | Ritter et al. | Nov. 20, 1956 |
| 2,795,565 | Newey | June 11, 1957 |
| 2,810,733 | Greenspan | Oct. 22, 1957 |
| 2,836,605 | Rowland et al. | May 27, 1958 |
| 2,872,349 | Hunn | Feb. 3, 1959 |
| 2,955,958 | Brown | Oct. 11, 1960 |

UNITED STATES PATENT OFFICE
CERTIFICATE OF CORRECTION

Patent No. 3,047,415                          July 31, 1962

Philip H. Rhodes et al.

It is hereby certified that error appears in the above numbered patent requiring correction and that the said Letters Patent should read as corrected below.

Column 2, line 30, after "epoxy" insert -- oxygen --; line 43, for "unsautration" read -- unsaturation --; column 3, line 26, for "purposes" read -- purpose --; column 8, line 51, for "300" read -- 30 --.

Signed and sealed this 20th day of November 1962.

(SEAL)
Attest:

ERNEST W. SWIDER
Attesting Officer

DAVID L. LADD
Commissioner of Patents